D. A. KENNEDY.
SAWING MACHINE.
APPLICATION FILED JULY 27, 1907.
927,248.
Patented July 6, 1909.
6 SHEETS—SHEET 6.
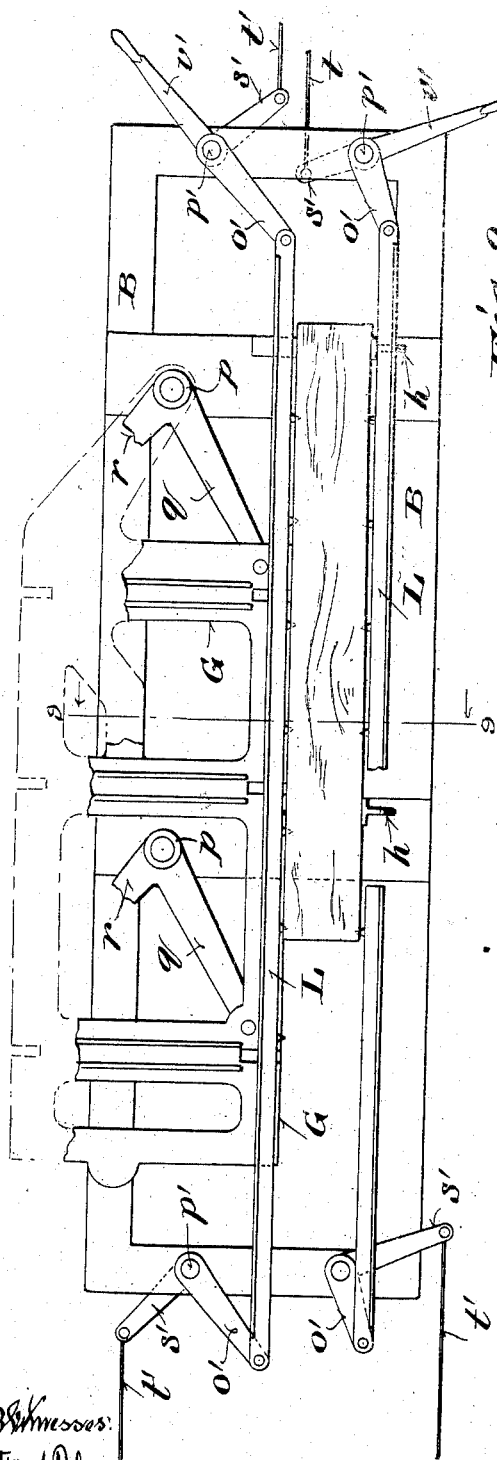
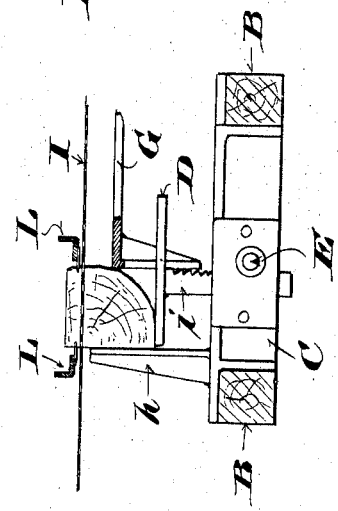

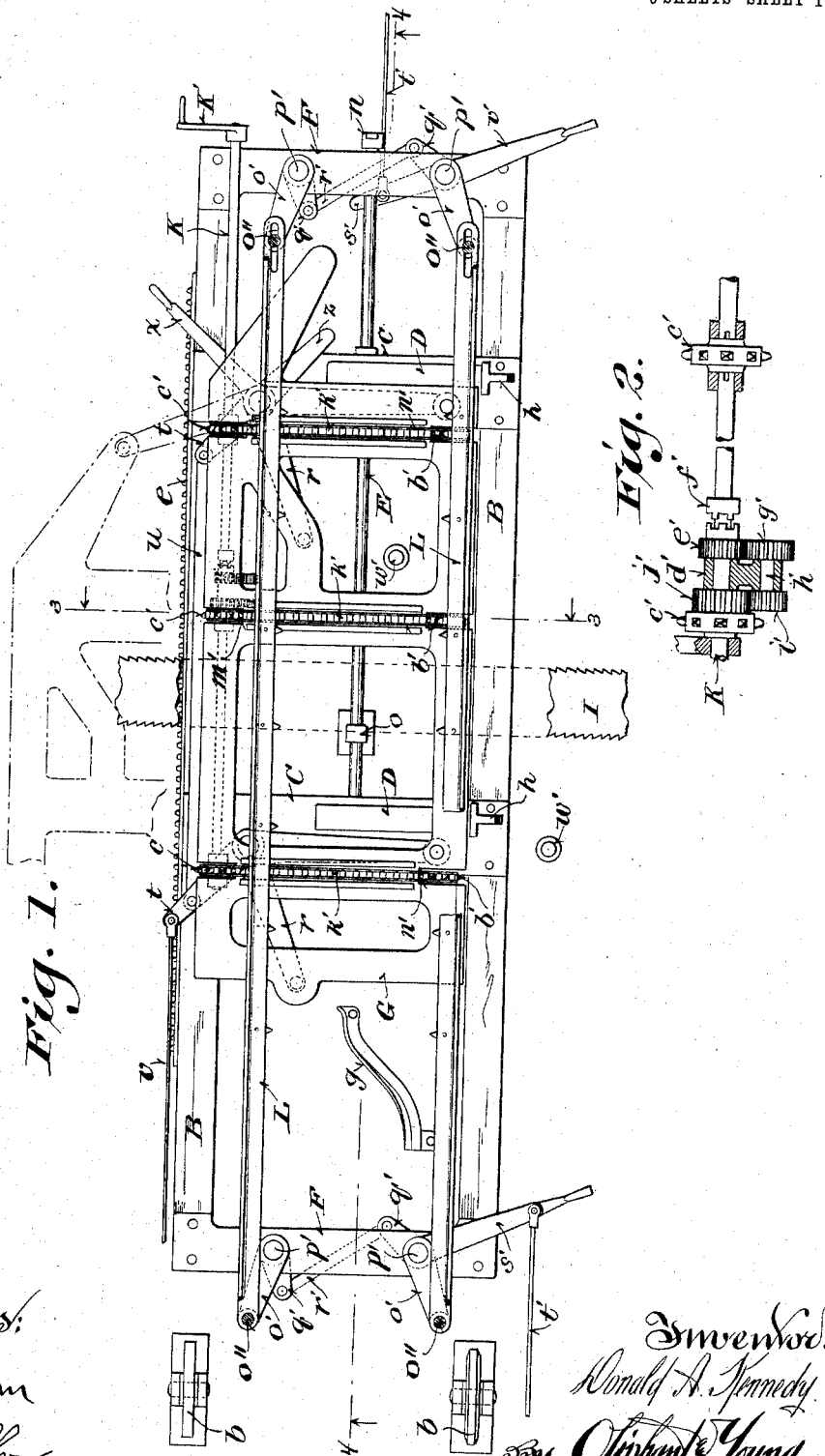

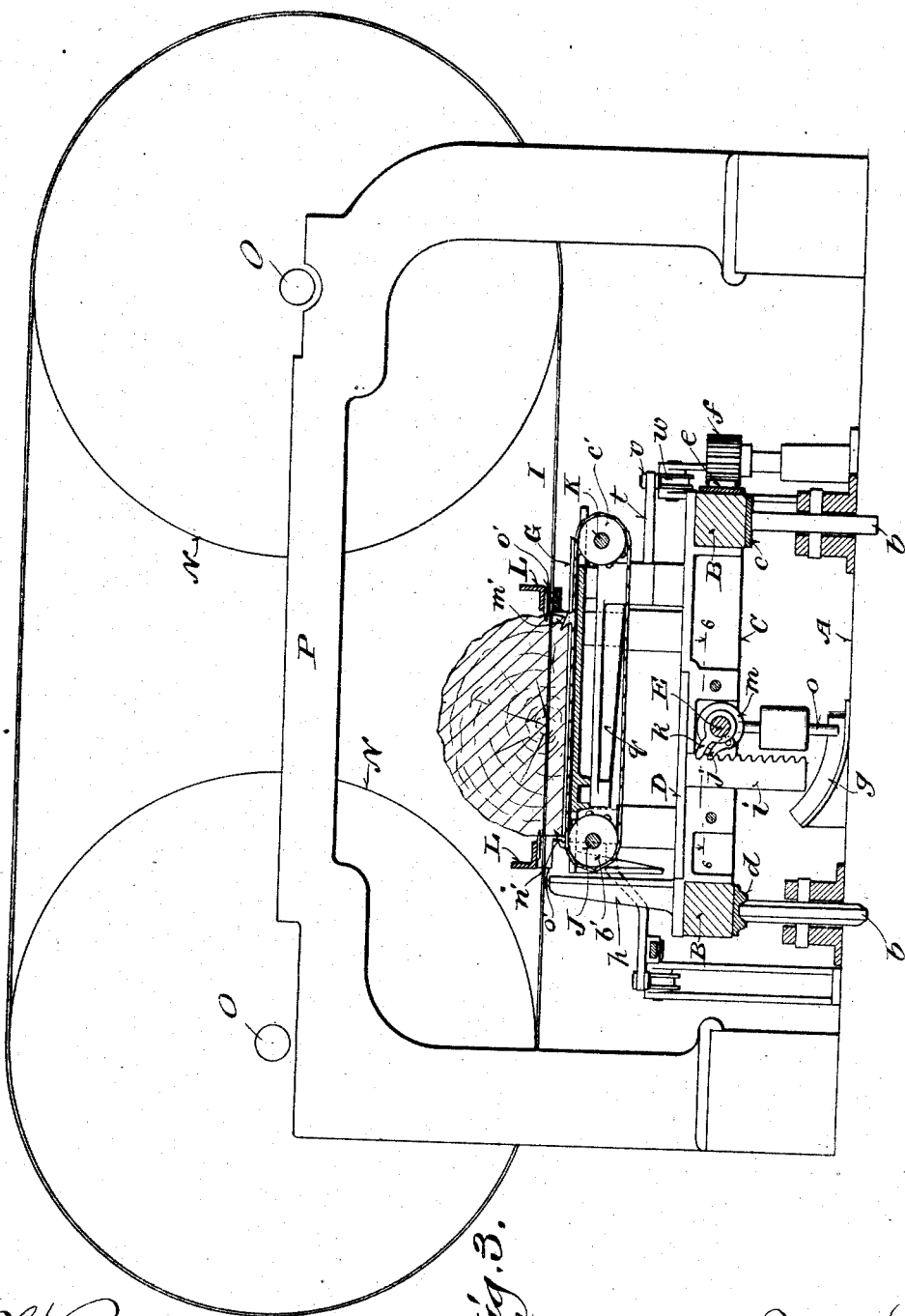

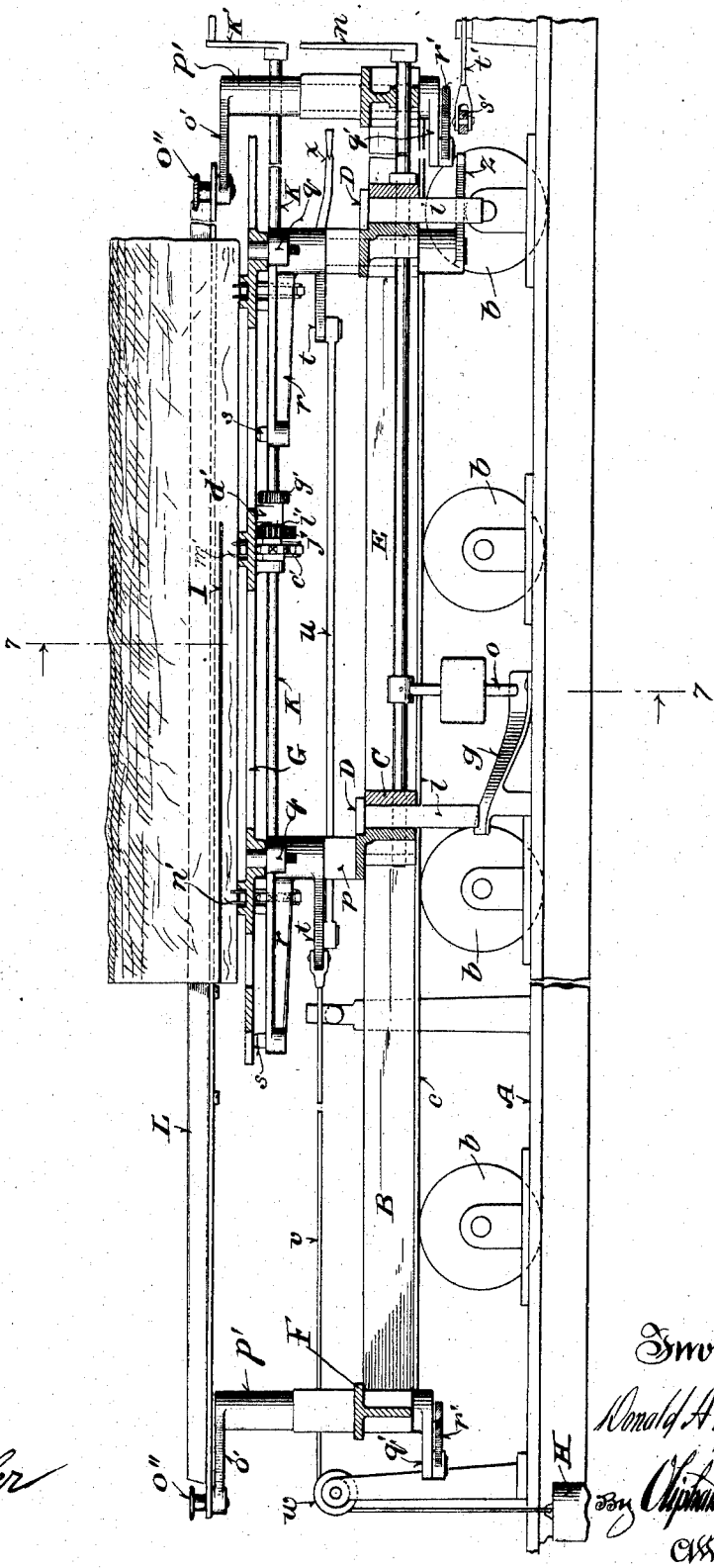

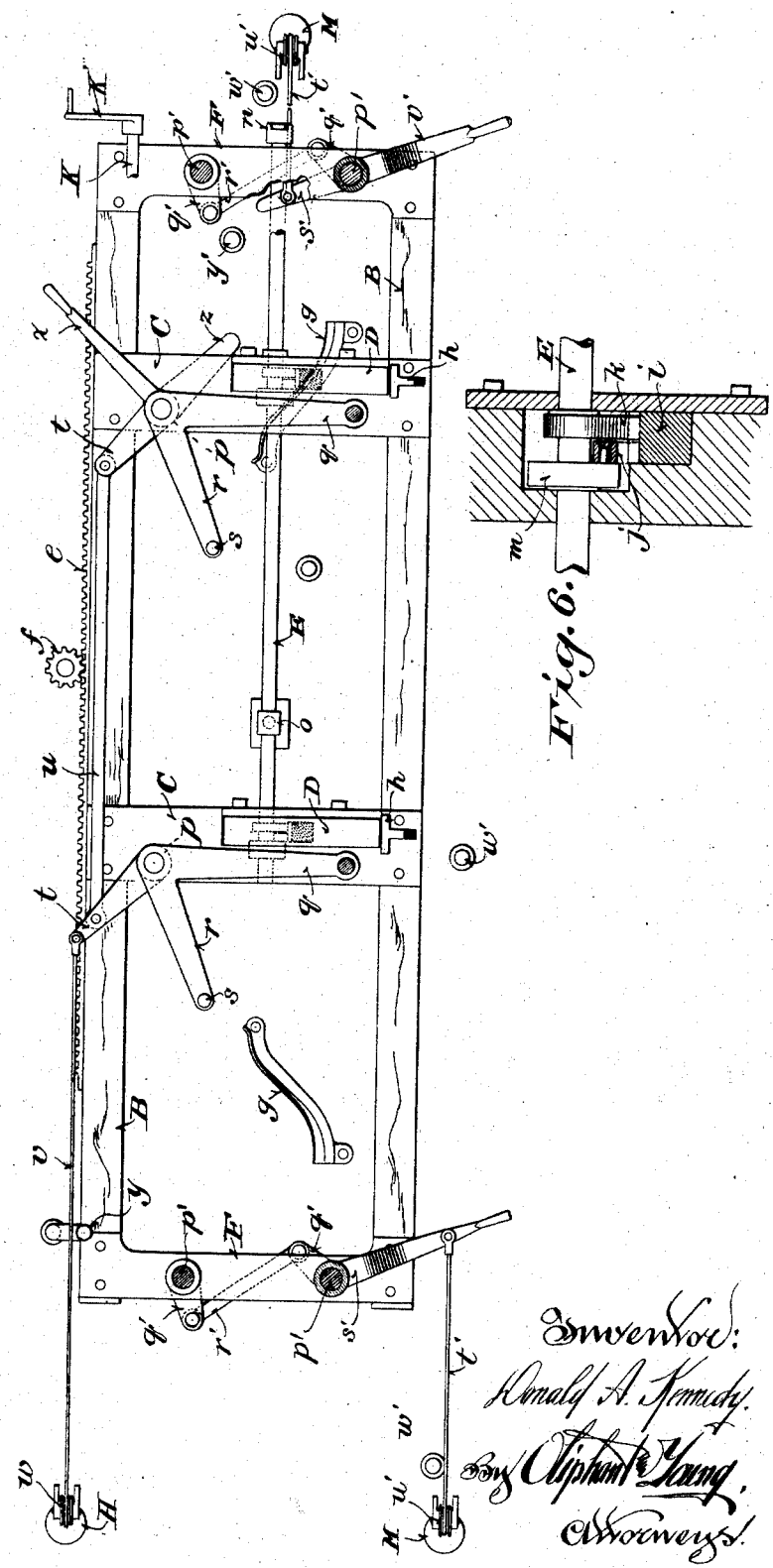

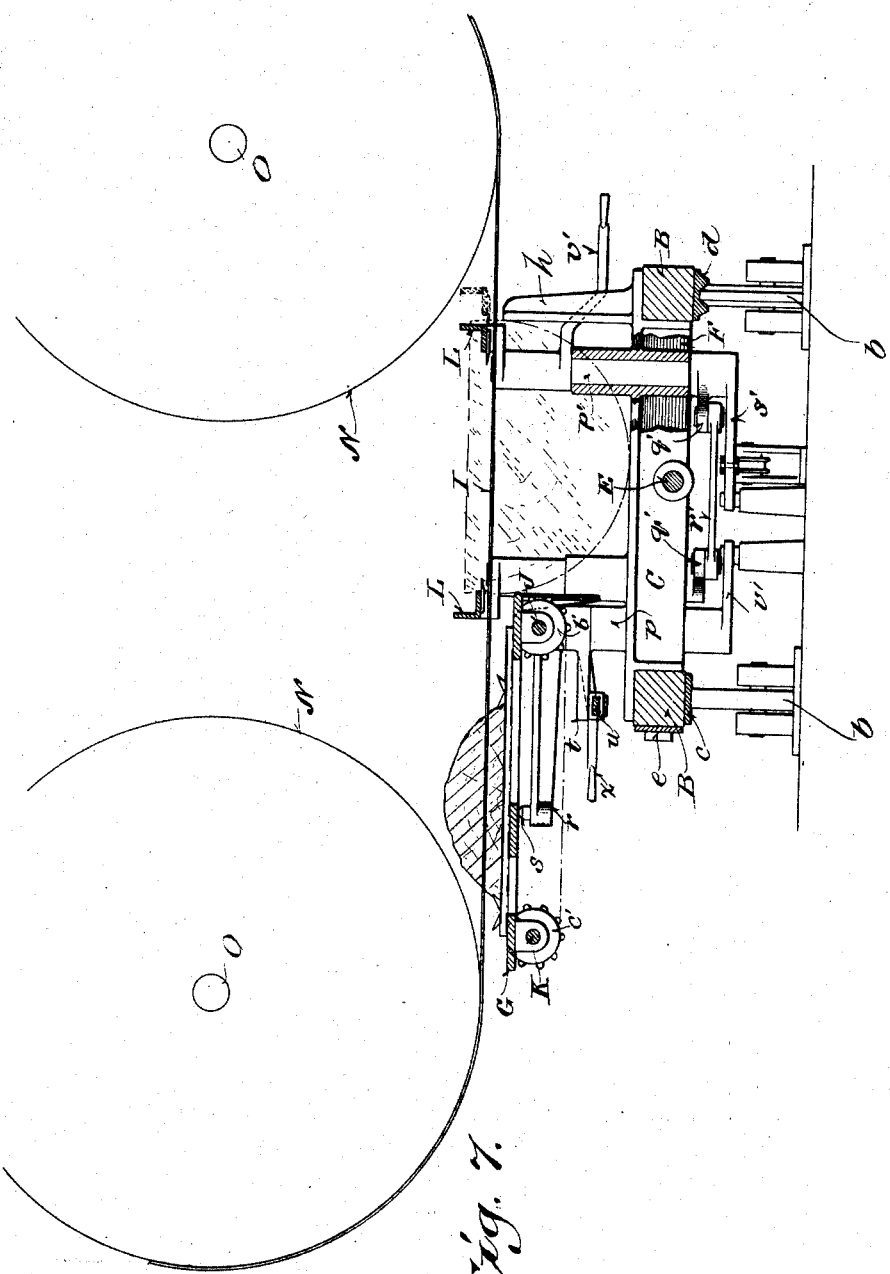

UNITED STATES PATENT OFFICE.

DONALD A. KENNEDY, OF ASHLAND, WISCONSIN.

SAWING-MACHINE.

No. 927,248.   Specification of Letters Patent.   Patented July 6, 1909.

Application filed July 27, 1907. Serial No. 385,874.

*To all whom it may concern:*

Be it known that I, DONALD A. KENNEDY, a citizen of the United States, and resident of Ashland, in the county of Ashland and State of Wisconsin, have invented certain new and useful Improvements in Sawing-Machines; and I do hereby declare that the following is a full, clear, and exact description thereof.
The improvements consist in what is herein shown, described and claimed; the object of the invention being to provide simple, economical and highly efficient horizontal band-sawing machines in which a reciprocating carriage is provided with automatic chucking and adjusting means above and below the cutting plane of the saw, for the purpose of holding round logs, or irregular bodies of timber, or any section thereof while same is being sawed in any form desired, the saw for this purpose having both edges thereof toothed, in order that a cut may be made incidental to the movement of the reciprocated carriage of the machine in either direction.

Figure 1 of the accompanying drawings represents a plan view of a sawing-machine embodying my improvements, Fig. 2, a detail of same, Fig. 3, a transverse section view of the machine on the plane indicated by line 3—3 in Fig. 1, including the bandsaw wheels and a supporting arch for same, Fig. 4, a longitudinal section view of the machine on the plane indicated by line 4—4 in Fig. 1, Fig. 5, a plan view of the machine partly in horizontal section, a swing-table portion of said machine and chuck-bars being detached, Fig. 6, a partly sectional view of a pawl-and-ratchet detail of the machine on the plane indicated by line 6—6 in Fig. 3, Fig. 7, a transverse section view of the machine on the plane indicated by line 7—7 in Fig. 4, a cross-piece of the reciprocative carriage of said machine being broken in this view, Fig. 8, a plan view of a fragment of the machine illustrating another form of means for chucking and supporting material above the saw when a table constituting part of said machine is employed to chuck material against knees of a carriage below said saw, and Fig. 9, a transverse sectional view indicated by line 9—9 in Fig. 8.

Referring by letter to the drawings, A indicates a saw-mill floor provided with bearings for the axles of wheels $b$ opposing rails $c$, $d$, of carriage side-beams B, one of these rails being in groove-fit upon the opposing wheels to prevent lateral displacement of the carriage. One side-beam of the carriage is shown, in Fig. 5, provided with a rack $e$ in mesh with a pinion $f$ that is rotated alternately in opposite directions by any suitable power to reciprocate said carriage, but other suitable means may be employed for the same purpose. Fast on the floor aforesaid are cam-tracks $g$ for the purpose hereinafter specified.

Normally seated in cross-pieces C of the carriage, flush with the tops of same, and adjacent to knees $h$ thereon, are supports D having depending rack-shanks $i$ each engaged by a lifting pawl $j$ and a detent $k$, the pawl being wristed to a wheel $m$ fast on an arbor E upon which the detent is loose, this construction and arrangement of parts being clearly illustrated in Figs. 3 and 6. The cross-pieces C are intermediate of end-pieces F of the carriage and all these transverse portions of said carriage are provided with bearings for the aforesaid arbor to which a hand-lever $n$ is connected. To provide for automatic lift of the supports D, at about the time the carriage completes its movement in either direction of travel, a weighted stem $o$ is arranged in rigid connection with the arbor E to depend therefrom and have contact with one or the other of the aforesaid cam-tracks. The opposing cam-track swings the stem in a direction to cause a rock of the arbor, the result being lift of the supports D, and there is automatic return of said stem and pawls $j$ to normal position the detents $k$ serving to hold said supports in adjusted position. When it is desired to lower the supports D, the pawls $j$ and detents $k$ are moved out of engagement with the corresponding rack-shanks of said supports, whereby these supports are permitted to drop of their own gravity. A sawmill set-works may be employed in connection with the arbor E aforesaid.

In pivotal support on upper bosses $p$ of the carriage cross-pieces C are bell-crank levers having arms $q$ thereof in pivotal connection with a table G, other arms $r$ of these levers being provided with supporting studs $s$ for the table. Auxiliary arms $t$ of said bell-crank levers are connected by a link-rod $u$, and one of these arms is connected by a flexible runner $v$, such as a cable, with a weight H, a pulley $w$ being provided for the support of said runner. A handle $x$ is shown in connection with one of the aforesaid levers to facilitate manipulation of the table against resistance of the weight H, and stops $y$ $y'$ are respectively arranged in the path of the lever arm $t$ and another lever-arm $z$ to provide for automatic swing of said table against resistance of said weight, it being understood that in practice the arrangement of said stops will be such as to cause a swing of the table for a limited distance at a predetermined time previous to that at which the carriage completes its movement in either direction of travel.

When in the adjusted position shown by dotted lines in Fig. 1, and full lines in Fig. 7, the table serves as means for chucking the material to be sawed on the supports D against the knees $h$ aforesaid below the cutting plane of the saw I, the chucking being automatic because of the weight H, it requiring a slight outward swing of said table to unchuck said material preliminary to a lift of same as the result of a manual or automatic rock of the arbor E aforesaid. As a matter of detail, the table is preferably provided with a depending flange parallel to the aforesaid knees. When the table is adjusted over the carriage, as best shown in Figs. 1 and 3, it serves as a support for the material to be cut, and suspended in depending bearing ears of said table are shafts J, K, for sprocket-wheels $b'$, $c'$ respectively. The wheels $b'$ are fast on the shaft J, and the shaft K has spline-engagement with all but the middle one of the wheels $c'$, this middle wheel being loose on said shaft K that of itself is loose in a depending bracket $d'$ of the table adjacent to a spur-gear hub-extension of said loose sprocket-wheel. Loose on the shaft K, adjacent to one side of the bracket $d'$, is a spur-pinion $e'$ having a clutch-hub for the engagement of a clutch $f'$ fast on said shaft. The pinion meshes with a spur-wheel $g'$ fast on a spindle $h'$ that turns in said bracket. Another spur-pinion $i'$ is fast on said spindle in mesh with the spur-gear hub-extension $j'$ of the sprocket-wheel $c'$ that is loose on the shaft K, whereby this sprocket-wheel is back-geared. The shaft K is provided with a crank K' by which it is manually rotated, and certain of the bearing-ears and the bracket aforesaid are the means by which the sprocket-wheels $c'$ are prevented from having play longitudinally of said shaft.

Each of a series of link-belts $k'$ engage opposite sprocket-wheels $b'$, $c'$, and the back-gear aforesaid is such that the middle belt of the series has about one-half the speed of the other belts when all these belts are in motion in the same direction, the shaft K being then in clutch with the main pinion of said gear and in rotation. Each link-belt is provided with a spur, the one $m'$ of the slow belt being opposite the spurs $n'$ of the other belts. Hence when material to be sawed is placed on the table it is readily clutched by the spurs aforesaid, as a result of turning the shaft K for the time being in clutch with the main pinion of the back-gear aforesaid, the chucking being done below the cutting plane of the saw.

The material above the cutting plane of the saw is caught and chucked by normally parallel tooth-bars L that are shown in Fig. 1, connected at their ends by set-screws $o''$ with cranks $o'$ of vertical spindles $p'$ for which end-pieces F of the carriage are provided with bearings. Lower cranks $q'$ of the spindles are connected in pairs by links $r'$, and levers $s'$ of said spindles are connected by flexible runners $t'$, such as cables, with weights M, pulleys $u'$ being provided for the support of said runners. By chucking the material above the cutting plane of the saw with the toothed bars aforesaid, said bars serve as supports for said material and thus prevent the same from dropping on said saw. The bars L are slotted at one end to provide for adjustable connection with the adjacent cranks $o'$, and said bars are uncoupled from said cranks whenever necessary to place a saw.

One of the spindles $p'$ is provided with a supplementary lever $v'$, and the bars L and parts in connection therewith are shown as they would appear adjusted for the chucking of straight material parallel thereto on the table, the weights M serving to cause a draw of said bars toward one another, whereby provision is had for automatic chucking of material of varying thickness. To provide for automatic adjustment of the toothed bars to chuck material more or less tapered or not disposed on the table parallel to the normal disposition of said bars, the set-screw in the slot at one end of each bar is loosened.

After a cut in either direction, the material above the cutting plane of the saw is supported by the toothed bars L and the shaft K is rotated in the proper direction, out of clutch with the back-gear aforesaid, to discharge the cut piece of said material from the table below said plane of the saw. The bars L being retracted, the material previously supported by the same is dropped upon the table for another cut, said material being again chucked as aforesaid.

To provide for automatic retraction of the toothed bars from opposing material stop $w'$ may be provided in the paths of the levers $s'$ and the lever $v'$, the disposition of these stops being such, in practice, that the unchucking of said material by said bars occurs at about the time the carriage completes its movement in either direction of travel. A cut having been effected and the material unchucked, said material is elevated with its supports D and rechucked for another cut, the previous cut piece of lumber being left in place or removed, as may be most convenient.

The wheels N for the saw have their arbors O mounted in bearings provided on suitably arranged arches P one of which is shown in Fig. 3, and any suitable means may be employed to drive said saw.

The table aforesaid being approximately in the position shown in Figs. 7 and 9, material thereon, chucked below the saw, and material on the supports D chucked by said table against the knees $h$ on the carriage and by the toothed bars aforesaid may be cut when said carriage is run in either direction.

In Fig. 8, the cranks $q'$ and links $r'$ shown in Fig. 1, are omitted, and each spindle $p'$ is shown provided with a lever $s'$ connected to a runner $t'$ that is in turn connected to a weight (not shown) similar to the weight M in said Fig. 1. A hand-lever $v'$ is shown in connection with each of the spindles $p'$ at one end of the machine. Like in Fig. 1, the toothed chucking-bars L L in Fig. 8, are connected to cranks $o'$ of the spindles $p'$, and the general construction and arrangement of the aforesaid movable parts in said Fig. 8, is such that said bars have a floating motion to accommodate themselves to material of varying thickness, when the same is chucked between the knees $h$ of the carriage and the table G below the cutting plane of the saw, said material being at rest on the vertical supports D and fed upward from time to time by an adjustment of said supports as above specified.

I claim:

1. In a horizontal band-saw machine, the saw, a reciprocative carriage, log supports movable in the carriage, means for automatic vertical adjustment of the supports subsequent to a sawing operation, and hand-lever and power-controlled automatically adjustable chucking devices for the log longitudinally of same, the chucking being under continuous pressure during a sawing operation.

2. In a horizontal band-saw machine, the saw, a reciprocative carriage, log supports movable in the carriage, means for automatic vertical adjustment of the supports subsequent to a sawing operation, and hand-lever and power-controlled automatically adjustable chucking devices for the log longitudinally of same above and below the cutting plane of the saw, the chucking being under continuous pressure during a sawing operation.

3. In a horizontal band-saw machine, the saw, a reciprocative carriage provided with vertically adjustable supports for the material to be sawed, and lever-and-power controlled toothed chucking-bars in connection with the carriage above the cutting plane of the saw to have automatic conformity to the longitudinal shape and the position of said material during a sawing operation.

4. In a horizontal band-saw machine, the saw, a reciprocative carriage provided with vertically adjustable supports for the material to be sawed, toothed chucking-bars in automatically adjustable connection with the carriage above the cutting plane of the saw and automatically conformable under continuous pressure to the longitudinal shape and the position of said material during a sawing operation, and means for automatic predetermined retraction of the chuck-bars.

5. In a horizontal band-saw machine, the saw, a reciprocative carriage, log supports in vertically adjustable connection with the carriage, and a table in bell-crank connection with said carriage to chuck material on the supports against carriage-knees.

6. In a horizontal band-saw machine, the saw, a reciprocative carriage, a table in bell-crank connection with the carriage, means in connection with the table for chucking material to be sawed thereon below the cutting plane of the saw and for removing sawed material, and means in connection with said carriage for chucking said material to be sawed above said plane of the saw.

7. In a horizontal band-saw machine, the saw, a reciprocative carriage, a table in pivotally adjustable connection with the carriage to be swung over the same or to one side thereof, means in connection with the table for chucking material to be sawed thereon below the cutting plane of the saw, and means in connection with said carriage for chucking said material above said plane of the saw when the table is in position over the aforesaid carriage.

8. In a horizontal band-saw machine, the saw, a reciprocative carriage provided with side knees, a table in pivotally adjustable connection with the carriage to be swung over the same or to one side thereof, vertically adjustable supports in connection with said carriage for material to be sawed, means for tensioning the swing-table against said material between it and said knees to chuck said material, and means in connection with said table for independent chucking of material to be sawed thereon.

9. In a horizontal band-saw machine, the saw, a reciprocative carriage provided with side knees, a table in pivotally adjustable connection with the carriage to be swung over the same or to one side thereof, automatic vertically adjustable supports in connection with said carriage for material to be sawed, means for exerting constant pressure of the swung out table against said material between it and said knees below the cutting plane of the saw, means in connection with the aforesaid carriage for automatic chucking and supporting the aforesaid material above said plane of the saw, and means in connection with said table for independent chucking of material to be sawed thereon and automatic discharge of the sawed material therefrom.

10. In a horizontal band-saw machine, the saw, a reciprocative carriage, log supports movable in the carriage, means for vertical adjustment of the supports to regulate their distance from said saw, means in connection with the carriage for chucking said material below the cutting plane of the saw, link-connected bell-cranks also in connection with the carriage, parallel toothed chucking-bars in connection with the bell-cranks to engage the aforesaid material above the plane of the saw, and means for operating said cranks.

11. In a horizontal band-saw machine, the saw, a reciprocative carriage, log-supporting mechanism movable in the carriage, means for effecting an automatic elevation of said mechanism at about the time the carriage completes its travel in either direction, means for independent chucking of material to be sawed above said saw, and means for automatic release of the sawed material.

12. In a horizontal band-saw machine, the saw, a reciprocative carriage, log-supporting mechanism movable in the carriage, means for chucking the log on said mechanism, means for effecting elevation of the aforesaid mechanism to regulate the thickness of material to be cut from said log by said saw, means for independent chucking of said material above the aforesaid saw longitudinally thereof under continuous pressure during a sawing operation, means for automatic unchucking of the aforesaid log and elevating adjustment of its supporting mechanism at about the time the said carriage completes its travel in either direction, and means for automatic release of the sawed material.

In testimony that I claim the foregoing I have hereunto set my hand at Ashland, in the county of Ashland and State of Wisconsin, in the presence of two witnesses.

DONALD A. KENNEDY.

Witnesses:
CLARENCE DENNIS,
F. J. COLIGNON.